E. AMES.
Harvester Rake.
No. 87,817.
Patented March 16, 1869.
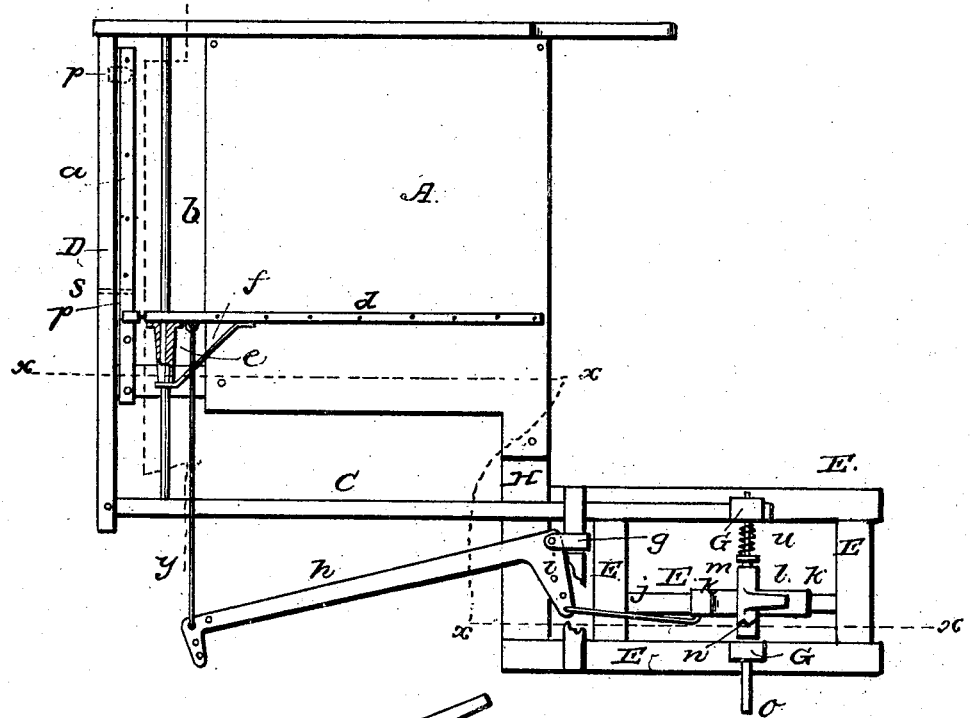
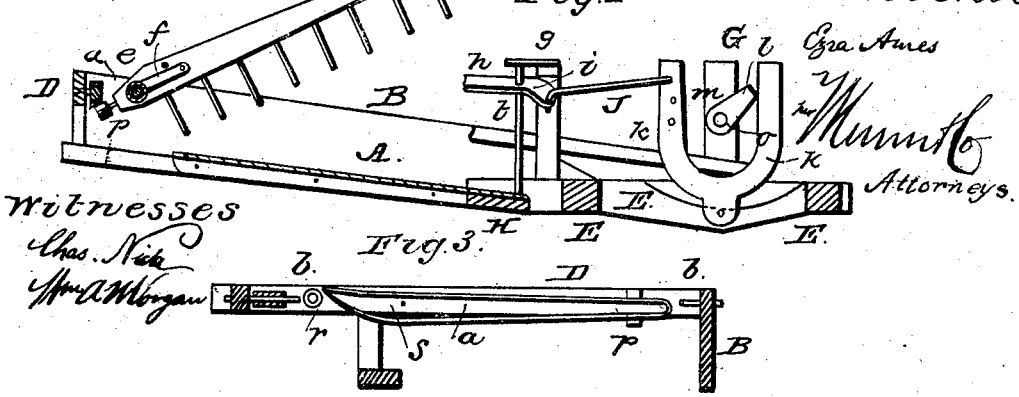
Witnesses
Chas. Nick
Wm A Morgan
Inventor
Ezra Ames
by Munn & Co
Attorneys.

UNITED STATES PATENT OFFICE.

EZRA AMES, OF AUSTIN, MINNESOTA.

IMPROVEMENT IN HARVESTER-RAKES.

Specification forming part of Letters Patent No. 87,817, dated March 16, 1869.

*To all whom it may concern:*

Be it known that I, EZRA AMES, of Austin, in the county of Mower and State of Minnesota, have invented a new and Improved Self-Rake Attachment for Harvesters; and I do hereby declare that the following is a full, clear, and exact description thereof, which will enable others skilled in the art to make and use the same, reference being had to the accompanying drawing, forming part of this specification, in which—

Figure 1 is a plan view of my invention. Fig. 2 is a section of the same through the line $x\,x$, Fig. 1. Fig. 3 is a section of the same through the line $y\,y$, Fig. 1.

Similar letters of reference indicate like parts.

The object of this invention is to provide a simple and effective self-rake attachment for harvesting-machines. It consists of the combination of devices, as herein set forth.

In the drawings, A is the platform of a harvester, and B C D the general frame, which is affixed to the main frame E of the said harvester.

My invention is designed to be attached to what are known as "side-delivery machines," in contradistinction to such machines as deliver the grain quarterly from the platform, as in the "John P. Maury machine," so called, and other similar ones. In side-delivery machines, however, the grain is raked off in lines parellel to the cutter-bar, and it is to such machines that my invention is chiefly applicable.

In my invention the rake-head $d$ travels on a rod, $b$, affixed to the parts B and C of the platform-frame, and arranged parallel to the cutter-bar, which latter is not shown in the drawings, but which, in practice, is just in front of the part H, and in the drawing may be represented by it.

The rake-head is provided with teeth in the usual manner, and is also provided with a sleeve, $e$, sliding freely on the rod $b$, so as to afford a more extended bearing-surface on the rod, thereby preventing the rake-head from cramping. It also affords attachment for a short brace, $f$, which latter conduces to strengthen the attachment of the rake-head and the said sleeve. The rake is moved to and fro across the platform by means of the rod $g$ and vibrating arms or bell-crank $h\,i$, which latter is pivoted on some suitable rod or shaft, $t$.

The arm $i$ is connected by a rod, $j$, with one of the parts of the vibrating U-shaped cam-yoke $k\,k$, the lower part of which is pivoted to any suitable part or attachment of the gear-frame E, as shown.

The vibration of the cam-yoke is accomplished by means of a cam or cam-arm, $l$, which forms part of a sleeve, $m$, working loosely on the shaft $o$ of the driving-wheel. This sleeve is provided with a spring, $u$, coiled around the shaft $o$, which actuates it against the ratchet-teeth $n$, keyed in the same shaft. This device $m\,n$ is for the purpose of permitting the harvesters to be backed without operating the rake, and to throw the rake out of gear in taking the harvesters to and from the field; for the part $m$ is formed with an annular groove to receive the forked end of the lever generally used in throwing certain parts of the mechanism out of working-connection with other parts, and is in itself a well-known device.

It will be observed that the shaft $o$ need not necessarily be the shaft of the main driving-wheel of the machine, and in some machines it might not be advantageous to place the cam-arm on it, in which case an auxiliary shaft, deriving its motion from the drive-wheel through suitable gearing, would be employed.

In the revolution of the cam-arm $l$ it acts alternately against the upright parts of the yoke $k\,k$, and thus produces the vibration of the latter. This vibration is communicated through the link or rod $j$ to the arm $h$, and the latter in vibrating moves the rake to and fro across the platform.

The rake is made to turn on the rod $b$ as a center, as it reaches forward on the platform toward the separator-board B, by means of a guide-rail, $a$, which is pivoted to some fixed part of the platform, as the part D thereof.

The pivot-bolt on which the guide-rail vibrates is shown at $s$.

The rake-head projects a short distance beyond the rod $b$, and is provided with a friction-roller, $r$, working freely on a stud or stem projecting from the rake-head, as shown. In the passage of the rake-head in reaching on to the platform this roller passes under the guide-rail $a$, the inner end thereof being rounded up or beveled from the under side, so as to insure the proper encountering of the roller with it. This is also further insured by means of the vibrating character of the guide-rail, as will be evident from further description of the operation of the latter. The outer end of the guide-rail rests on a projection, *p*, as shown.

In Figs. 2 and 3 the roller is shown entering under the guide-rail *a;* the rake is reaching on the platform. The rake is thus raised, as shown at Fig. 2, and continues in this raised position throughout the extent of its travel in that direction, thus passing above the grain as it lies on the platform.

When the roller arrives at the end of the guide-rail the rake falls horizontal, bringing its teeth in the proper position to gather and rake off the grain as the rake moves back again to the raking-off side of the platform. In thus moving back the roller passes above the guide-rail, and when it has passed the pivot *s* of the latter the gradually up-curved inner end of the guide-rail is encountered by the roller and depressed until the roller leaves it, when it again rises above the line of the roller's horizontal motion, and presents its beveled end for the roller to encounter at the commencement of the reaching movement of the rake.

The guide-rail is so arranged with reference to the raking-off edge of the platform that the roller will encounter the said beveled edge of the guide-rail, and thereby cause the rake to be lifted at the commencement of its reach, so as to clear the grain which fell on the platform after its passage to the raking-off side.

It will be observed that the under side of the guide-rail is beveled to correspond to the raised position of the rake-head, whereby the weight of the long arm of the rake-head, acting as a lever, will not exert a direct upward force on the guide-rail and act to lift its longer arm and thus let down the rake before it reaches the full extent of its reaching or travel. The raised position of the rake also decreases its leverage effect on the guide-rail. These two conditions enable the longer arm, when properly weighted, to retain the rake in its raised position, and at the same time not present too great a resistance to the roller in tipping down the curved end of the guide-rail at the close of the raking-off movement.

It will be obvious that other means than those shown may be employed to obtain the proper vibration of the arm *h;* and I desire to be understood as not limiting the pivoted guide-rail and vibrating rake to the combination with the cam-arm and U-shaped yoke, but design using any other device in lieu of the latter which may be found suitable and more desirable.

The chief merit, however, of the cam and yoke is that a sufficient lost motion may be obtained by varying the form of the yoke so as to cause the rake to move faster or slower, as desired.

Having thus described my invention, I claim as new and desire to secure by Letters Patent—

1. The combination, in a self-rake attachment for harvesters, of the pivoted guide-rail *a* with the rake head and rod *b*, substantially as and for the purpose herein set forth.

2. Arm *h i*, rods *g* and *j*, cam-yoke *k k*, cam *l*, and coupling-clutch *m n*, substantially as and for the purpose herein shown and described, when forming part of a self-rake attachment for harvesters, all as set forth.

EZRA AMES.

Witnesses:
  E. C. DORR,
  ORLENZER ALLEN.